United States Patent [19]

Krambeck et al.

[11] 3,735,156

[45] May 22, 1973

[54] REVERSIBLE TWO-PHASE CHARGE COUPLED DEVICES

[75] Inventors: Robert Harold Krambeck, South Plainfield; Carlo Heinrich Sequin, Summit, both of N.J.

[73] Assignee: Bell Telephone Laboratories, Incorporated, Murray Hill, N.J.

[22] Filed: June 28, 1971

[21] Appl. No.: 157,510

[52] U.S. Cl. ............307/304, 317/235 R, 317/235 G

[51] Int. Cl. ............H01l 11/14

[58] Field of Search ............317/235 B, 235 G; 307/304

[56] References Cited

UNITED STATES PATENTS

| | | | |
|---|---|---|---|
| 3,533,089 | 10/1970 | Wahlstrom | 317/235 |
| 3,621,283 | 11/1971 | Teer | 317/235 |
| 3,654,499 | 4/1972 | Smith | 317/235 |
| 3,564,355 | 2/1971 | Lehovec | 317/235 |

*Primary Examiner*—Jerry D. Craig
*Attorney*—R. J. Guenther and Arthur J. Torsiglieri

[57] ABSTRACT

Two-phase charge coupled devices are disclosed with no asymmetry in the structure to prevent reversing the direction of flow of charge carriers. The structure includes sets of two electrodes separated by wide gaps. An appropriate fixed charge in these gaps allows storage and transfer of charge carriers. The charge may be localized in the gap, or may be implanted uniformly over the surface of the device in the storage medium or in the insulating layer.

Unidirectionality of transfer is achieved by a pulse train having an asymmetric phase relation. Reversing the phase relation reverses the directionality of charge.

8 Claims, 7 Drawing Figures

INVENTORS R.H. KRAMBECK
C.H. SEQUIN
BY Lester H. Birnbaum
ATTORNEY

REVERSIBLE TWO-PHASE CHARGE COUPLED DEVICES

BACKGROUND OF THE INVENTION

Recently, a new type of information storage device known as the charge coupled device (CCD) has been described and developed for a wide variety of information processing applications. (The charge coupled device concept is fully described and claimed in U.S. Pat. application of W. S. Boyle and G. E. Smith, Ser. No. 11,541, filed Feb. 6, 1970.) Briefly, the charge coupled device comprises a charge storage medium, an insulating layer overlying one surface of the medium, and an array of metal electrodes disposed upon the insulator. Information is introduced in the medium in the form of mobile charge carriers. These charge carriers may be moved through the medium in a direction essentially parallel to the surface of the medium by successively biasing a series of the electrodes. Usually, the storage medium is a semiconductor, the charge carriers are minority carriers, and the transfer mechanism is characterized by the creation of depletion regions of varying depths into which the minority carriers "spill." However, the storage medium may also comprise a semi-insulating material wherein the charge carriers are majority carriers as described and claimed in U.S. Pat. application of D. Kahng, Ser. No. 47,205, filed June 18, 1970 now U.S. Pat. No. 3,700,932. In a two-phase system, the electrodes are driven by two clock lines, with each line coupled to every other electrode in a row. In a three-phase system, three clock lines are employed, with each line coupled to every third electrode in the row.

The two-phase CCD has the advantage of a short bit length and the requirement of only one level of metallization to drive a row of electrodes. However, some asymmetry is required in the electrodes to contour the potential well in the medium in order to achieve unidirection of transfer. This asymmetry may take the form of a stepped oxide (see, for example, U.S. Pat. application of D. Kahng and E. H. Nicollian, Ser. No. 11,448, filed Feb. 16, 1970 now U.S. Pat. No. 3651,349), or a small region of charge under each electrode which provides a blocking potential to reverse flow. (See U.S. Pat. application of R. H. Krambeck—R. H. Walden, U.S. Pat. application Ser. No. 157,509 filed concurrently with the present application.) This requirement precludes the application of two-phase systems to certain logic operations where reversal of the direction of flow is desired.

A three-phase system does not require any asymmetry and will permit reversibility. However, the longer bit length of the structure restricts the speed of operation of the device, and two levels of metallization or diffused cross-unders are required to address the array of electrodes thereby complicating fabrication.

SUMMARY OF THE INVENTION

It is therefore the primary object of the invention to provide a two-phase charge coupled device with no asymmetry in the electrodes so that direction of charge flow is reversible.

This and other objects are achieved in accordance with the present invention wherein every set of two electrodes is separated by a wide gap. Fixed charge in the gap, located near the insulator-storage medium interface either in the storage medium or in the insulator, creates a potential which allows storage of charge carriers in the gap when both electrodes are at a low dc bias and transfer of carriers through the gap when suitable potentials are applied to the adjacent electrodes. Directionality of charge flow is determined by the asymmetric phase relation of the pulses supplied to the electrodes. Reversing the phase relation reverses the direction of flow.

BRIEF DESCRIPTION OF THE DRAWING

These and other features of the invention will be delineated in detail in the description to follow. In the drawing.

DETAILED DESCRIPTION

Figure 1A:
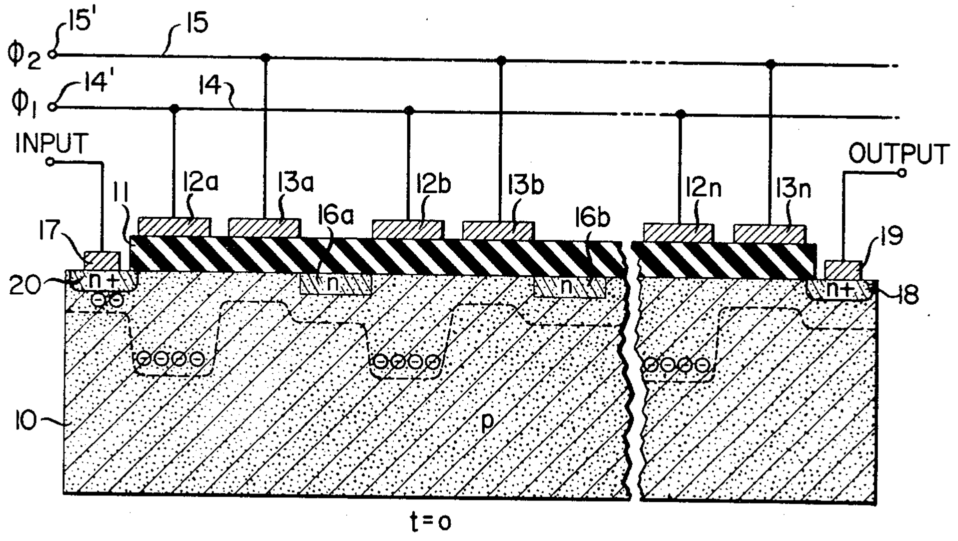
FIGS. 1A–1D are cross-sectional views, partly schematic, of a portion of a charge coupled device in accordance with one embodiment of the present invention demonstrating movement of charge through the storage medium.

The structure and operation of the invention is described with reference to FIGS. 1A–1D which are cross-sectional views of a portion of a CCD constructed in accordance with the inventive principles described herein. As shown in FIG. 1A, the charge coupled device comprises a charge storage medium, 10, such as P-type silicon, an insulating layer, 11, such as silicon dioxide, overlying one surface of the medium, and a series of metal electrodes, **12*a–n* and 13*a–n*, disposed on the insulating layer forming essentially a row of MIS devices. Every other electrode in the array is coupled to one of two conductors, 14 and 15, to which are supplied clock pulses at the terminals 14' and 15'. The pulse trains supplied to 14' and 15' are represented by $\Phi_1$ and $\Phi_2$ respectively. Electrode 17 with the contacted $N^+$ zone 20 causes the introduction of minority carriers into the semiconductor as by the application of a proper potential. The minority carriers are detected at the other end of the row by the combination of localized $N^+$ zone 18 and electrode 19** which is reverse biased by some means (not shown) such that minority carriers are collected by the P–N junction and appear as a current at the terminal. The means for injecting and detecting the minority carriers are varied and well known in the art, and consequently form no part of the present invention. (For a discussion of various input and output means, see, for example, the pending application of Boyle and Smith, supra.) It is particularly noted here, however, that one of the methods of supplying minority carriers is through the generation of hole-electron pairs by photon absorption. Hence, the invention described here is suited for use as a line or area imaging device of the type described, for example, in U.S. Pat. application of M. F. Tompsett, Ser. No. 124,735, filed Mar. 16, 1971.

The electrodes are situated such that they form sets of two electrodes (e.g., **12*a* and 13*a*), each electrode coupled to one of the conductors 14 and 15, with a narrow gap (approximately 2–3 microns) separating the two electrodes in a set. Each set, however, is separated by a wide gap (approximately 10 microns) which will be referred to as a storage gap. Implanted into the semiconductor in the region of the storage gaps are areas of fixed positive charge, e.g., 16*a* and 16*b***. The magnitude of charge is chosen so as to produce a depletion region in the gap of sufficient depth to store minority carriers (electrons) when both electrodes in a set are at a low DC bias and to permit the minority carriers to travel through the gap according to the potential difference of adjacent electrodes. This will be described in more detail below.

It should be recognized that while a P-type semiconductor is shown by way of example, an N-type semiconductor or semi-insulating medium is equally adaptable to the principles of the invention. An N-type material would merely require an implant of fixed negative charge in the gap.

Figure 1B:
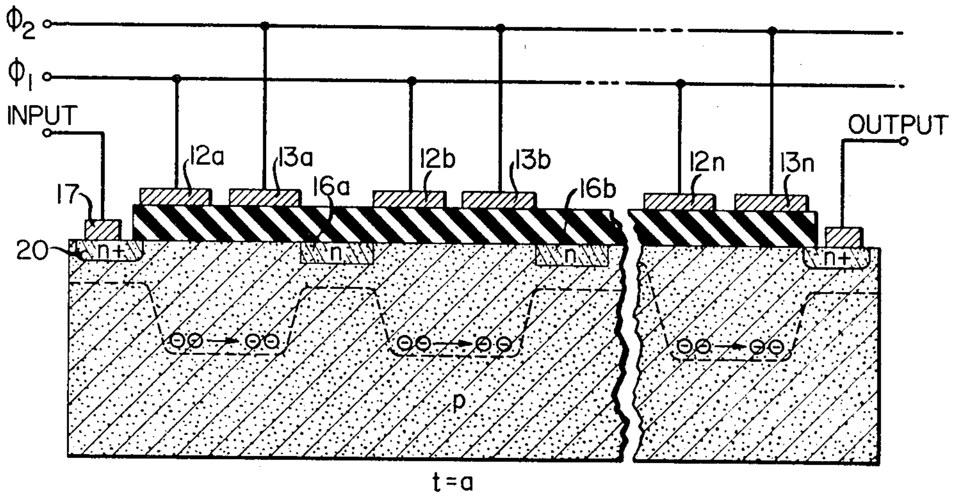
Figure 1C:
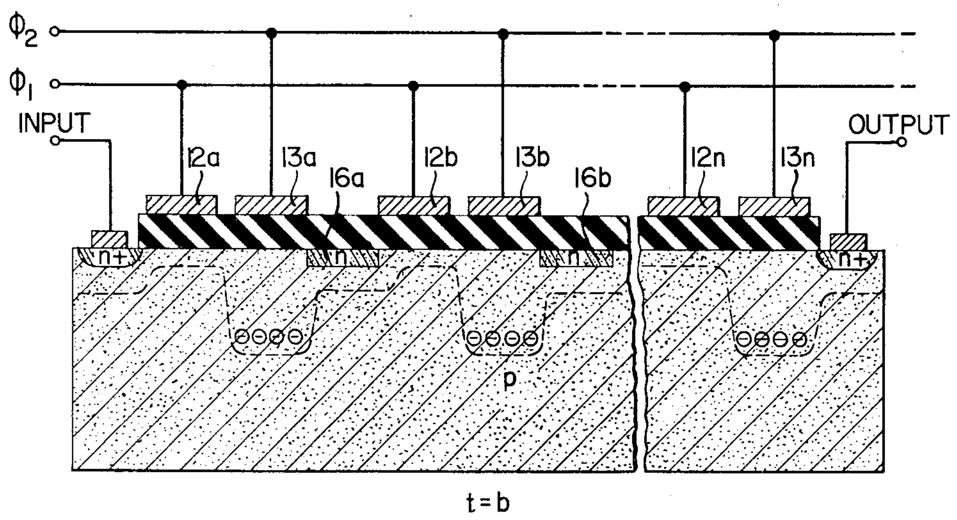
Figure 1D:
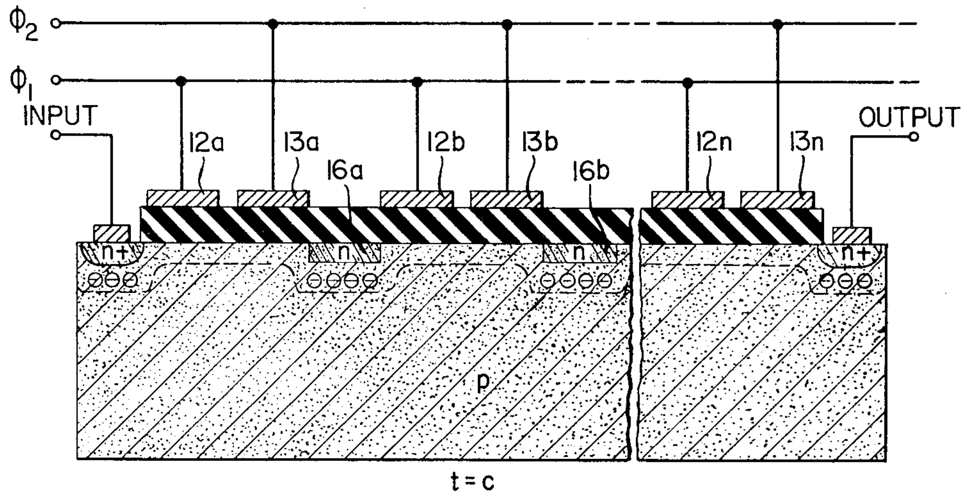
Figure 2:
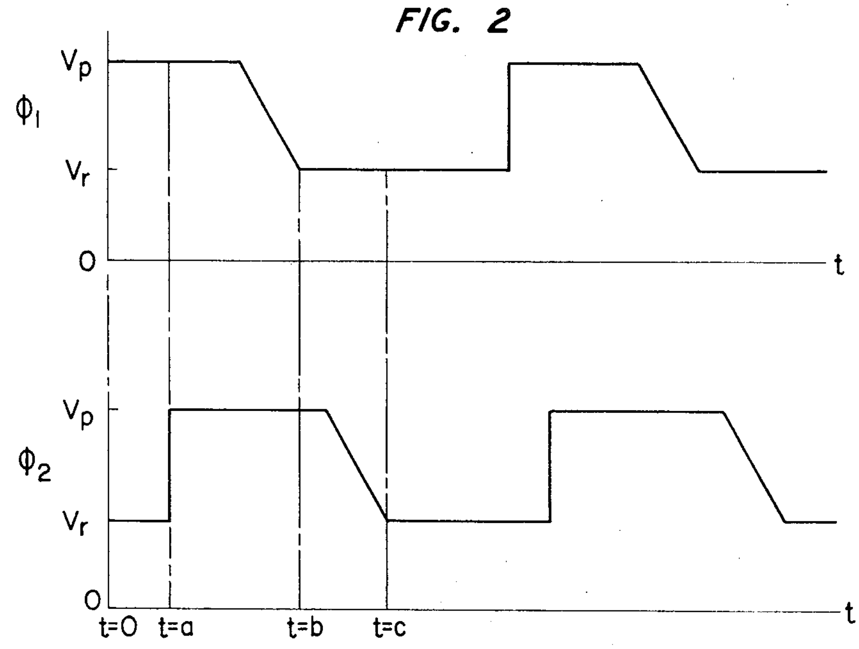
FIG. 2 is a schematic diagram of the asymmetric pulse train applied to each conduction path of a charge coupled device made in accordance with the same embodiment.

In the operation of the device, pulse trains as shown in FIG. 2 are applied to terminals 14' and 15'. The important feature here is the asymmetric phase relation between the pulses supplied to the two terminals. That is, the pulse applied to electrodes **13*a–n* ($\Phi_2$) must overlap the pulse applied to electrodes 12*a–n* ($\Phi_1$), however the electrodes 13*a–n* must be pulsed off before a pulse is again supplied to 12*a–n*. This provides directionality to the charge flow as illustrated in FIGS. 1A–1D**. At this point, it should be recognized that in a preferred embodiment some resting potential $V_r$ is always applied to the electrodes to keep the oxide-semiconductor interface depleted at all times. Therefore, a pulsed on (or biased) condition is a reference to a pulse applied to an electrode resulting in a potential $V_p$, while a pulsed off (or unbiased) condition refers to the application of a resting potential ($V_r$) only.

Referring to FIG. 1A, at $t = 0$, a pulse has been supplied to conductor 14 to bias electrodes **12*a*–12*n*. This results in a depletion region depth (indicated schematically by the dashed lines in the semiconductor) which is greater under electrodes 12 than in the area under electrodes 13 or in the area of the storage gap. Therefore, minority carriers represented by "⊖" will collect under these electrodes. The depletion region depth is representative of the potential created at the oxide-semiconductor interface. Thus, in other words, potential maxima are created under electrodes 12 to which any excess minority carriers in the form of electrons will be attracted. Since the depletion region under 12*a* overlaps that under electrode 17, electrons which have been injected into the semiconductor will be transferred to the area under 12*a***.

At time $t = a$, as illustrated in FIG. 1B, pulses are supplied to electrodes 13 while electrodes 12 remain pulsed. This equalizes the depletion region depth under both electrodes in a set and charge begins to drift to the right. It will be noticed that reverse flow of charge, for example from the area under electrode **12*b* to the area under 13*a*, is prevented by the potential barrier created by the region of fixed charge in the storage gap. That is, the magnitude of fixed charge is such that the depletion region in the storage gaps is more shallow than that under the pulsed electrodes and so transfer to the left of electrodes 12** is prevented.

As electrodes 12 are pulsed off, charge continues to flow into the regions under electrodes 13 until the situation shown in FIG. 1C at time $t = b$ is reached. Here, electrodes 12 are pulsed off (at resting potential $V_r$) and only electrodes 13 are pulsed on. The charge "packets" therefore now reside in the areas under electrodes 13.

Next, at $t = c$, electrodes 13 are pulsed off resulting in the condition shown in FIG. 1D. Since the potential under electrodes 13 is less than that in the storage gaps, the electrons will be attracted to the gaps and held there. Transfer of electrons to the left is prevented since the potential under the unpulsed electrodes 12 is less than that in the gaps. When electrodes 12 are again pulsed on, transfer continues to the right such that electrons are again localized under electrodes 12 having been moved through one full bit length. The process is then repeated any number of times.

It will be appreciated that since there is no asymmetry in the electrodes, the direction of charge flow may be reversed by simply reversing the pulsing sequence supplied to conductors 14 and 15. Thus, if pulse train $\Phi_1$ is now supplied to terminal 15' and $\Phi_2$ to terminal 14', charge will move to the left in FIGS. 1A–1D.

In the embodiment shown in FIGS. 1A–1D, the region of fixed positive charge is shown as localized in the storage gap. However, the principles described herein are equally applicable where the charge is introduced uniformly along the interface either in the oxide or in the semiconductor. The operation of such a device is essentially identical, the only difference being that the potential applied to the metal electrodes will be adjusted to account for the excess charge under the electrodes. Thus, in transferring charge in such a device, the potentials applied to the electrodes ($V_r$ and $V_p$) will be less than those shown in FIG. 2 to compensate for the excess positive charge.

Figure 3:
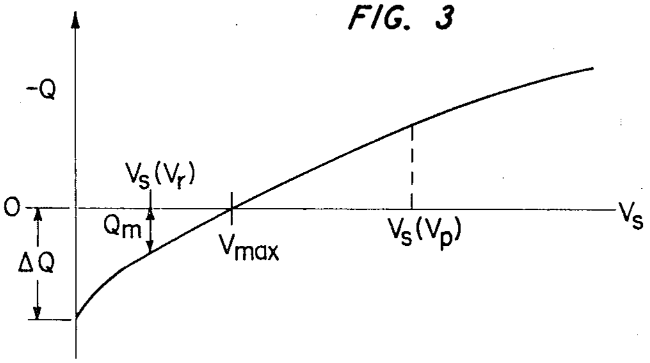
FIG. 3 is an illustration of fixed charge in a CCD as a function of surface potential in accordance with the same embodiment.

The magnitude of fixed charge density which must reside in the gap will be approximately equal to the density of minority carriers which will be stored in the gap when both electrodes are unbiased and when there is no resting potential applied ($V_r = 0$). If some resting potential is applied when the electrodes are in a pulsed-off condition, the fixed interface charge density in the gap must be greater than the charge to be stored. This is demonstrated by FIG. 3, which is an illustration of total fixed charge, $-Q$, in a P-type semiconductor and in the oxide as a function of surface potential, $V_s$, after some fixed positive charge $\Delta Q$ is added to the interface. When the electrodes are at potential $V_r$, a quantity of negative charge $Q_m$ is stored in the gap in order to make the field zero. If it is assumed that all added charge ($\Delta Q$) is at the oxide-semiconductor interface, using a one dimensional approximation of Poisson's equation, the charge added is given by:

$$\Delta Q = -Q_m + \frac{V_s}{|V_s|}\sqrt{2qN\epsilon_s|V_s|} \qquad (1)$$

where $q$ is the electronic charge, $N$ is the density of fixed charge in the semiconductor (other than the added charge), $\epsilon_s$ is the dielectric constant of the semiconductor and $V_s$ is the surface potential in the gap. $V_s$ is found from the equation:

$$V_s = V_r - \frac{|V_r|}{V_r}\frac{\delta^2 Nq\epsilon_s}{\epsilon_{ox}^2}\left[\sqrt{1+\frac{2|V_r|\epsilon_{ox}^2}{\delta^2 Nq\epsilon_s}}-1\right] \qquad (2)$$

where $V_r$ is the resting potential, $\delta$ is the thickness of the insulating layer, and $\epsilon_{ox}$ is the dielectric constant of the insulating layer. $V_{max}$, which is the maximum surface potential which can appear in the gap, must be between the surface potentials which correspond to $V_r$ and $V_p$ as demonstrated in reference to FIGS. 1A–1D. From equation (1), setting $Q_m = 0$, it is found that $V_{max}$ will depend on the doping density of the semiconductor, $N$, according to the equation:

$$|V_{max}| = (\Delta Q)^2/2q\epsilon_s N \quad (3)$$

assuming all added charge is at the interface and the doping density of the semiconductor is uniform. Equations (1), (2) and (3) apply to both N and P-type material.

In practice, the minimum density of minority carriers which will be stored in the gap to achieve a detectable signal, and hence the minimum charge density added, is approximately $10^{11}/cm^2$. The maximum density of added charge which should be utilized will be determined by the point at which the field created by the charge causes tunneling of minority carriers in the storage medium from the valence band to the condition band. This can be calculated according to the medium used by well-known techniques. For a silicon substrate, a practical maximum is approximately $5 \times 10^{12}/cm^2$.

The fixed charge may be introduced into the device by any of a number of means available in the art, for example, ion implantation or diffusion techniques.

A typical CCD comprising a P-type storage medium with positive charge implanted in the medium in the storage gap may be designed as follows:

$N = 10^{16}/cm^3$ $\delta = 10^{-5}$ cm $\epsilon_{ox} = 1/3 \times 10^{-12}$ F/cm $\epsilon_s = 10^{-12}$ F/cm storage gap width = 10 microns electrode width = 10 microns $V_r = 27$ volts $V_p = 17$ volts $\Delta Q/q = 10^{12}/cm^2$ $Qm/q = 6.5 \times 10^{11}/cm^2$ $V_{max} = 8$ volts In such a device, if the positive charge ($\Delta Q$) resided uniformly over the interface, the driving potentials would be $V_r = -2.3$ volts and $V_p = 12$ volts.

Figure 4:
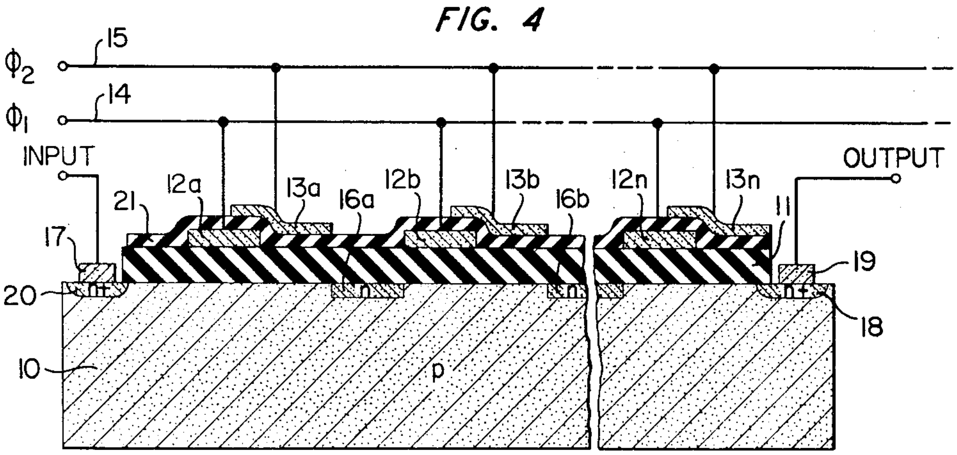
FIG. 4 is a cross-sectional view, partly schematic, of a portion of a charge coupled device in accordance with another embodiment of the invention.

It should also be recognized that the charge in the gap need not be physically introduced into the device if there is sufficient charge of a sign opposite to the fixed charge in the storage medium residing naturally in the insulating layer. For example, thermally grown silicon dioxide will naturally possess a positive charge density in the range $4 \times 10^{10}$ to $6 \times 10^{11}/cm^2$ and hence a P-type silicon storage medium with the proper fixed negative charge can be combined therewith to achieve the proper potential in the storage gaps. Such a CCD may be designed as follows:

$\Delta Q/q$ (naturally residing in oxide) $= 4 \times 10^{11}/cm^2$ $N = 10^{15}/cm^3$ $\delta = 10^{-5}$ cm $\epsilon_{ox} = 1/3 \times 10^{-12}$ F/cm $\epsilon_s = 10^{-12}$ F/cm $V_r = -.4$ volts $V_p = 16$ volts $Qm/q = 2.9 \times 10^{11}/cm^2$ $V_{max} = 13$ volts Various other modifications of the structure shown in FIGS. 1A–1D are possible. For example, an overlapping electrode array such as that shown in FIG. 4 can be constructed. Each electrode in the set is formed from a different level of metallization and the electrodes are separated by an additional insulating layer, 21. The advantage of this embodiment lies in the fact that no photo-resist or masking step is required to implant the charge in the storage gaps. This is due to the fact that the ions will penetrate to the storage medium 10, or insulating layer, 11, only in the areas not covered by an electrode, thereby defining the boundaries of implanted regions 16a and 16b. The structure also eliminates the smaller gap which may interfere with transfer.

It should also be noticed that the structures shown in FIGS. 1A–1D and FIG. 4 may be made with a very short bit length since there is no asymmetry in the structure and thus less features per bit length to present registration difficulties.

Various additional modifications and extensions of this invention will become apparent to those skilled in the art. All such variations and deviations which basically rely on the teachings through which this invention has advanced the art are properly considered within the spirit and scope of this invention.

What is claimed is:

1. A charge coupled device comprising a charge storage medium having fixed charge of a first polarity, an insulating layer covering at least a portion of one surface of said medium, a series of metal electrodes disposed upon said insulating layer so as to form a plurality of sets of two electrodes with a wider gap separating each set than the gap separating the two electrodes in a set, means for periodically biasing said sets of electrodes and the electrodes in the set sequentially comprising two conductors each connected to one electrode of each set of moving charge carriers in the storage medium in a direction essentially parallel to said surface, and a region of a fixed charge included in the wider gap of a polarity opposite to that of the fixed charge in the storage medium, the magnitude of said region of fixed charge being such as to store charge carriers in the wider gap when both electrodes in the sets are not biased and to allow transfer of charge through said wider gap in a desired direction during the period when said bias is applied.

2. The device according to claim 1 wherein the means for biasing the series of electrodes comprises means for supplying pulses to each of said conductors such that the pulses on the conductors overlap during a portion of the pulse.

3. The device according to claim 1 wherein said region of fixed charge is located in the storage medium.

4. The device according to claim 1 wherein said region of fixed charge is located in the insulating layer.

5. The device according to claim 1 wherein said region of fixed charge is confined to the area of the wider gap.

6. The device according to claim 1 wherein said region of fixed charge extends over essentially the entire area of the storage medium-insulator interface.

7. The device according to claim 1 wherein the minimum charge density of said region of fixed charge is $10^{11}/cm^2$.

8. The device according to claim 1 wherein the electrodes in each set partially overlap, with a second insulating layer lying between the electrodes at said points of overlap.

* * * * *